United States Patent [19]

Furlette et al.

[11] 4,364,471

[45] Dec. 21, 1982

[54] AUTOMATIC ACCUMULATING LIFT AND CARRY TRANSFER MECHANISM

[76] Inventors: James L. Furlette, 984 Bal Isle Dr., Fort Myers, Fla. 33907; Donald A. Stadler, 10400 Hartland, Fenton, Mich. 48430

[21] Appl. No.: 147,736

[22] Filed: May 8, 1980

[51] Int. Cl.³ ............................................. B65G 25/00
[52] U.S. Cl. ....................................... 198/751; 198/774
[58] Field of Search ............... 198/718, 751, 774, 777

[56] References Cited

U.S. PATENT DOCUMENTS

| | | | |
|---|---|---|---|
| 3,500,992 | 3/1970 | Tabor et al. | 198/751 |
| 3,545,600 | 12/1970 | Rudlaff | 198/751 |
| 3,552,543 | 1/1971 | Manetta | 198/751 |
| 3,590,987 | 7/1971 | Evans et al. | 198/751 |
| 3,687,275 | 8/1972 | Broser | 198/774 |
| 3,786,911 | 1/1974 | Milazzo | 198/718 |
| 4,240,542 | 12/1980 | Wiknich | 198/751 |

FOREIGN PATENT DOCUMENTS

| | | | |
|---|---|---|---|
| 518429 | 7/1976 | U.S.S.R. | 198/251 |
| 659472 | 4/1979 | U.S.S.R. | 198/718 |

*Primary Examiner*—Joseph E. Valenza

*Attorney, Agent, or Firm*—Gifford, VanOphem, Sheridan and Sprinkle

[57] ABSTRACT

An automatic accumulating lift and carry mechanism is provided and comprises an elongated frame having a plurality of work support members secured to and spaced longitudinally along the frame on each lateral side thereof which form work stations adapted to receive and support a workpiece. A main carriage assembly is longitudinally slidably mounted to the frame and a drive mechanism longitudinally reciprocally moves the carriage assembly between a forward and a retracted position. A pair of lifting members are pivotally secured to the main carriage assembly for each work station and are pivotal between an upper and a lower position. In their upper position, the lifting members engage and elevate a workpiece above the work support members at that work station while, in their lower position, the lifting members release the work onto the work support members. An actuating carriage assembly is longitudinally slidably mounted to the main carriage assembly and movable between an actuating and nonactuating position for pivoting the lifting members between their upper and lower position.

11 Claims, 6 Drawing Figures

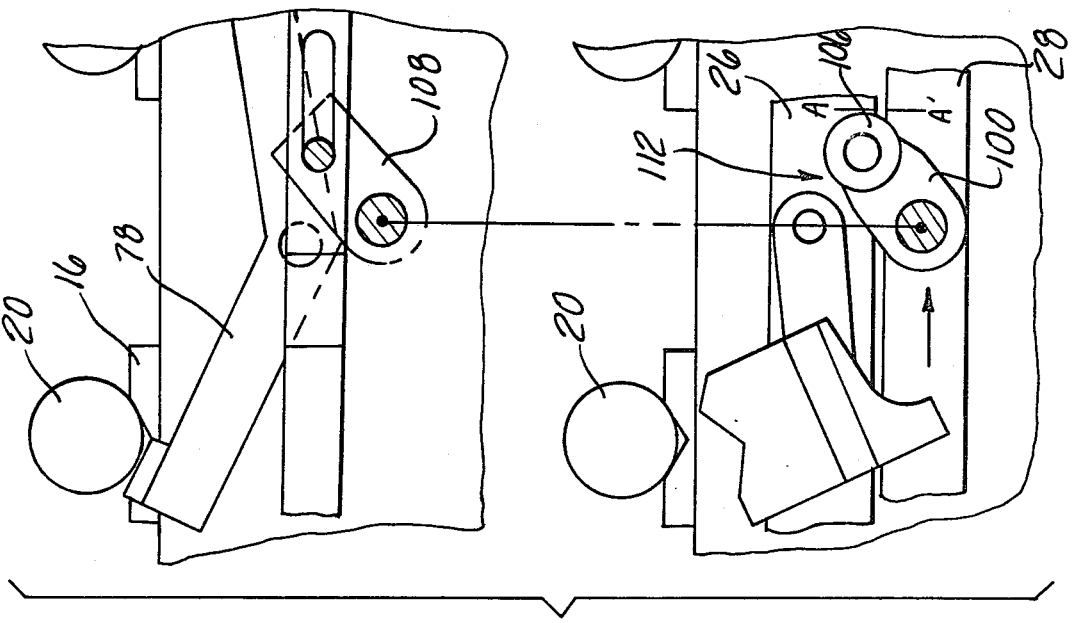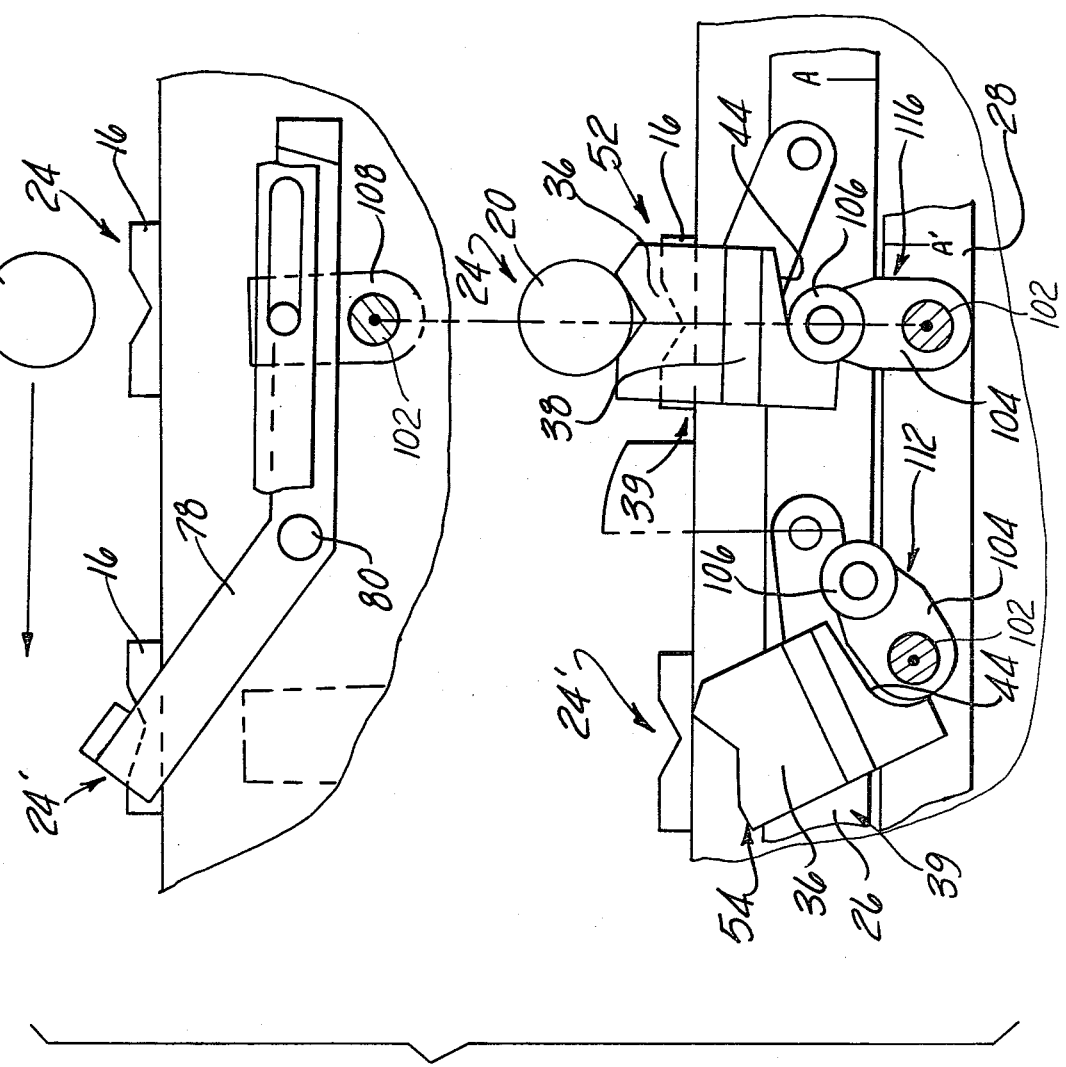

AUTOMATIC ACCUMULATING LIFT AND CARRY TRANSFER MECHANISM

BACKGROUND OF THE INVENTION

I. Field of the Invention

The present invention relates generally to mechanical transfer mechanisms and, more particularly, to a lift and carry transfer mechanism with automatic accumulating means.

II. Description of the Prior Art

Conveyors and conveyor systems are currently employed in manufacturing plants and facilities for transporting parts or pieces throughout the manufacturing plant. In one type of conveyor system, the parts or workpieces are longitudinally supported along a frame defining a conveyor track by work support members spaced at predetermined intervals along the conveyor frame.

A carriage assembly is both longitudinally and vertically slidably mounted to the conveyor frame and includes a plurality of longitudinally spaced lifting members secured to the carriage assembly so that at least one lifting member is associated with each work station. In operation, as the carriage assembly is moved to its upper vertical position, the lifting members lift the workpiece off from support members at their associated work station and, upon forward longitudinal travel of the carriage assembly, carry the workpiece to the next forward work station. At the next forward work station, the carriage assembly is moved to its lower position thus placing the workpieces on the work support members at the next forward work station after which the carriage assembly is retracted and the process is then again repeated.

Conventionally, the lifting members on the carriage assembly are rigidly secured to the carriage assembly so that the parts or workpieces positioned along the conveyor track and at the work stations are incrementally moved from one work station and to the next forward work station in unison with each other. One disadvantage, however, of the lift and carry conveyor systems of this type is that a vacant space along the conveyor track caused by the absence of a workpiece at that work station will also be moved along the conveyor track in unison with the workpieces. These vacant spaces along the conveyor track, of course, are disadvantageous since the conveyor system is not used at its maximum capability. Moreover, the lack of a workpiece or part at a designated work station in predetermined intervals can cause work interruptions and even a stoppage of the entire manufacturing line.

There have, however, been previously known conveyor systems in which pusher dogs are selectively actuated or moved to an upper workpiece engaging position in dependence upon the absence of a workpiece or part at a work station. When actuated to their upper workpiece engaging position, the pusher dogs engage and slidably move a workpiece along a pair of spaced stationary rails along the conveyor track. One conveyor system of this type is disclosed in U.S. Pat. No. 3,557,943 which issued on Jan. 26, 1971, to Richard Broser.

In a pusher dog type conveyor system, however, the pusher dogs are conventionally mounted to either a conveyor frame or a carriage assembly so that the pusher dogs are pivotal between an upper workpiece engaging position and a lower workpiece clearing position. Thus, retraction of the pusher dogs from their forwardmost position and to their rearwardmost position does not undesirably cause an interference between the pusher dogs and the workpieces upon the conveyor track. Conversely, in lift and carry conveyor mechanisms it is conventional to rigidly fix the lifting members to the carriage assembly and, in many cases, the lifting members themselves are merely a formed portion of the carriage assembly. Unlike the pusher dog type conveyor systems, a lift and carry conveyor system can be constructed in this fashion since the carriage is not only longitudinally slidably mounted to the conveyor frame but is also vertically movable between an upper and lower position. Consequently, with the carriage assembly in the lower position, the lifting members which are rigidly fixed to the carriage assembly will automatically clear the workpieces on the conveyor track during the retraction of the carriage assembly from its forwardmost and to its rearwardmost travel so that a pivotal connection between the lifting members and the carriage assembly is neither required nor desired.

One inherent disadvantage of the previously known lift and carry mechanisms is that the entire carriage assembly must be repeatedly moved between both an upper and lower position and also between a forward and retracted position. Consequently, the means employed to reciprocally lift and lower the carriage assembly, typically a hydraulic power mechanism, must be sufficiently powerful to lift not only the workpieces positioned along the carriage assembly but also the carriage assembly itself. As such, the power lifting means therefore, is necessarily of an expensive construction. Moreover, as the overall length of the conveyor system increases, both the difficulty and cost of insuring that the entire carriage assembly is both raised and lowered in unison is likewise increased.

SUMMARY OF THE PRESENT INVENTION

The present invention provides a lift and carry conveyor system with automatic accumulating means. In brief, the lift and carry conveyor system according to the present invention comprises an elongated frame having a plurality of spaced and parallel work support members secured on each lateral side of the frame and at predetermined longitudinal intervals therealong. The work support members on opposite lateral sides of the conveyor frame are in alignment with each other and together define a work station adapted to receive and support a workpiece thereon.

A main carriage assembly is longitudinally slidably mounted to the frame for an interval corresponding to the interval between adjacent work stations. A conventional reciprocal drive means is connected between the main carriage and frame and reciprocally longitudinally drives the main carriage assembly between a forward and a retracted position. This cycle is continuously repeated.

A plurality of lifting members are pivotally secured to the main carriage assembly so that at least one, and preferably two, lifting members are associated with each work station. The lifting members are pivotal between an upper position and a lower position. In their upper position, the lifting members engage and lift a workpiece up from the work support members at the work station. Conversely, in their lower position, the lifting members are positioned underneath and do not engage the workpiece.

An actuating carriage assembly is longitudinally slidably mounted with respect to the main carriage assembly between an actuating and a nonactuating position. Preferably, a hydraulic piston and cylinder arrangement is disposed between the main and actuating carriage assembly to reciprocally drive the actuating carriage assembly between its nonactuating and actuating positions. The longitudinal displacement of the actuating carriage assembly, moreover, is synchronized with the reciprocation of the main carriage assembly so that the actuating carriage assembly is moved to its actuating position just prior to the forward travel of the main carriage assembly. Similarly, the actuating carriage assembly is moved to its nonactuating position just prior to the retraction of the main carriage assembly.

A plurality of actuating members are pivotally secured to the actuating carriage assembly so that at least one actuating member is associated with each pair of lifting members. The actuating members are pivotal between a first and a second position. In their first position, the actuating members will engage and pivot their associated lifting members to their upper position as the actuating carriage assembly is moved to its actuating position. Conversely, with the actuating members in their second position, the actuating members do not engage their associated lifting members so that the lifting members remain in their lower position.

A detector arm is also associated with each work station and is movable between an upper position, in which a portion of the detector arm extends above the conveyor track at the work support member, and a lower position in which the upper end of the detector arm is below the conveyor track. During operation, a workpiece at the work station will move the detector arm to its lower position while, conversely, the absence of a workpiece at a particular work station will permit the detector arm associated with that work station to move by gravity to its upper position.

With the detector arm in an upper position, indicating an absence of a workpiece at that work station, at or near the rearwardmost position and during the retraction of the main carriage assembly, a cam member having a cam surface on the detector arm engages a cam pin connected with the actuating member and moves the actuating member from its second and to its first position. Thus, upon the subsequent movement of the actuating carriage assembly to its actuating position the pivoted actuating member will engage and move its associated lifting member to its upper position.

A link bar is longitudinally positioned between each adjacent pair of actuating members. Each link bar is pivotally connected by a pin to one actuating member and by a pin and slot arrangement to the next forward actuating member. Thus, the pivoting of one actuating member to its first position by the detector arm simultaneously pivots all actuating members rearwardly of the pivoted actuating member to their first position via the link bars. The actuating members forwardly of the most forward pivoted actuating member, however, will remain in their second position due to the pin and slot connection between the link bar and the actuating members.

After the actuating members have been selectively moved to their first position, the actuating carriage assembly is moved to its actuating position and the main carriage is thereafter driven from its retracted and to its forward position. When the main carriage assembly reaches its forward position, the actuating carriage assembly is again moved to its nonactuating position which lowers all lifting members which have been lifted to their lower position. This movement in turn deposits all workpieces engaged and lifted by the lifting members to be deposited at the next forward work station.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in which:

FIGS. 4-6 are split fragmentary sectional views illustrating the operation of the lift and carry transfer mechanism according to the present invention.

DETAILED DESCRIPTION OF THE PRESENT INVENTION

Figure 1:
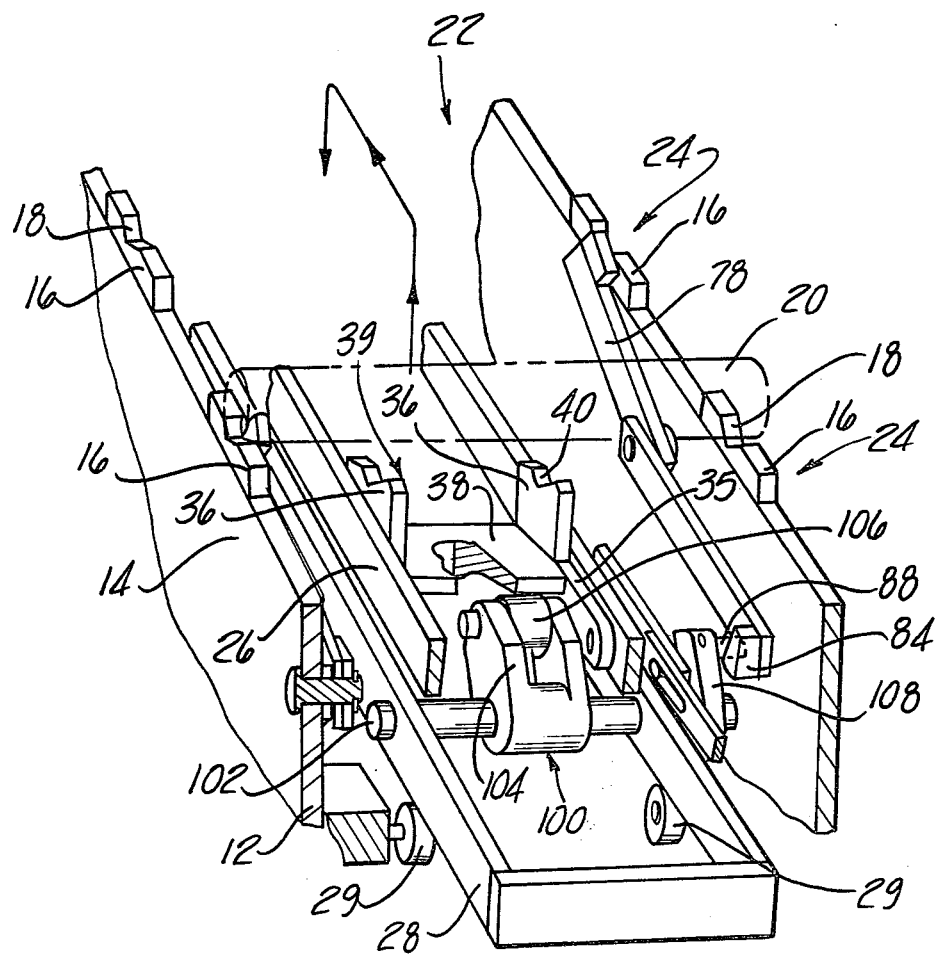
FIG. 1 is a diagrammatic perspective view showing the lift and carry transfer mechanism according to the present invention.
Figure 2:
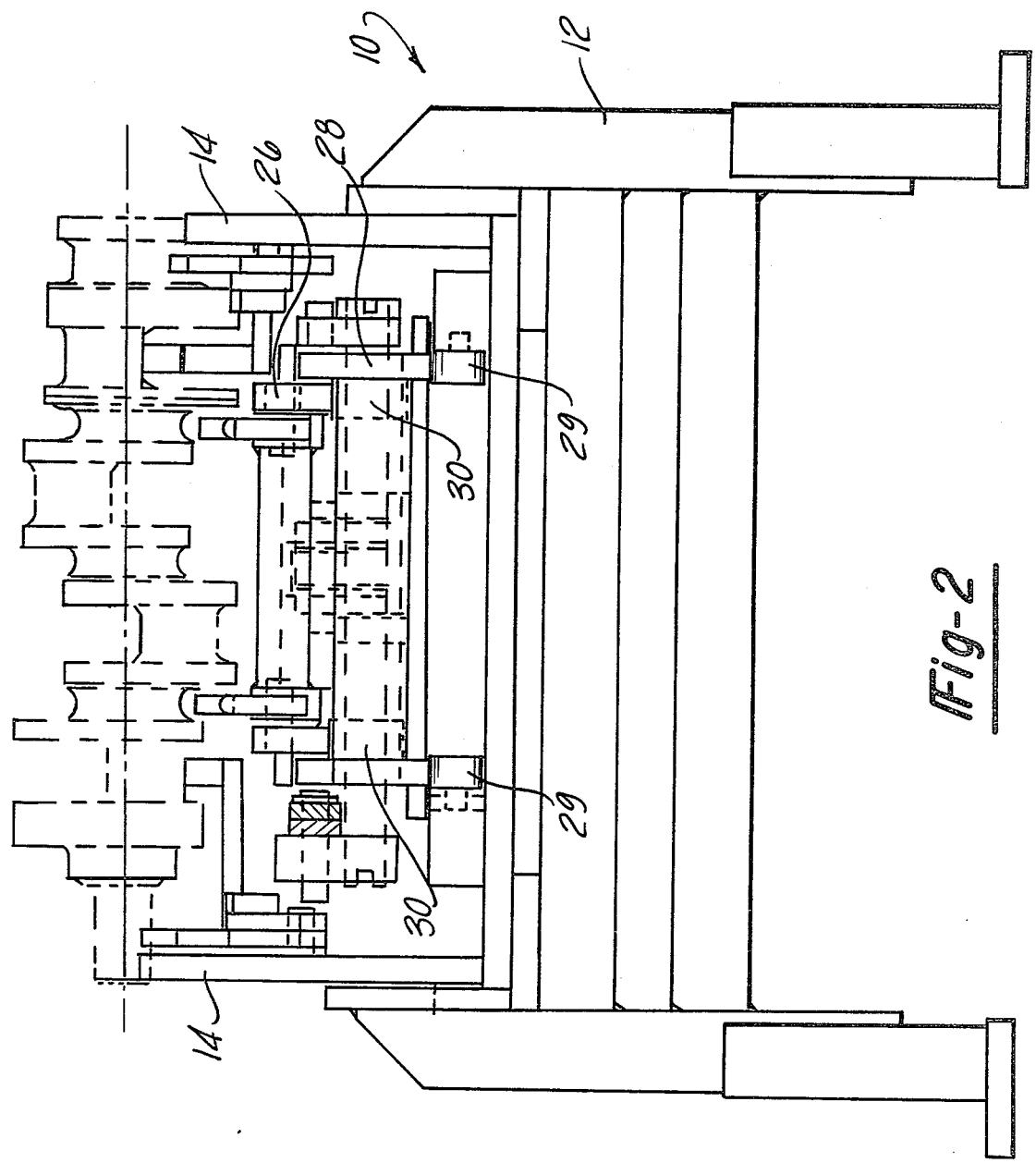
FIG. 2 is a transverse sectional view illustrating the lift and carry transfer mechanism according to the present invention.
Figure 3:
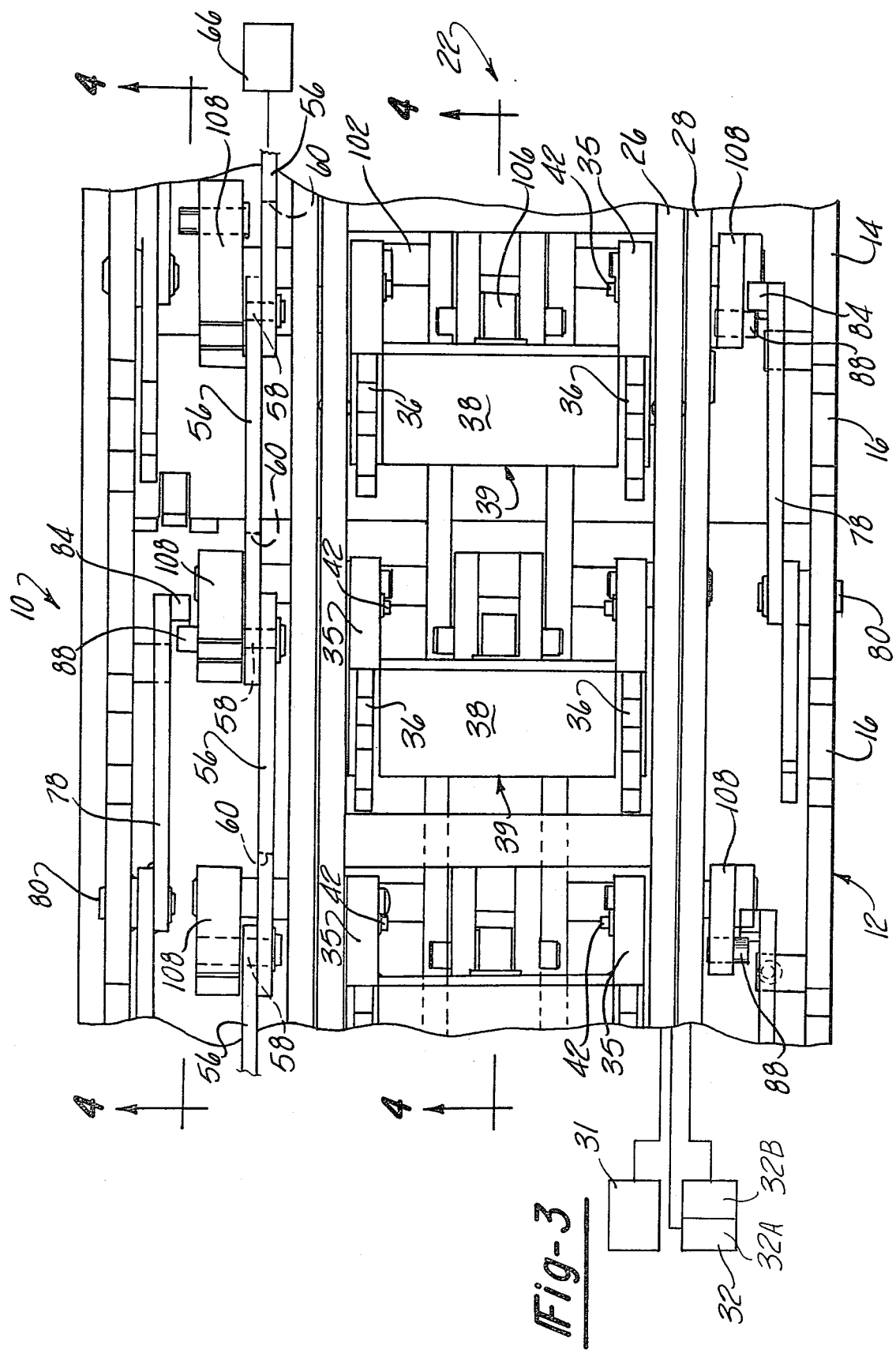
FIG. 3 is a fragmentary top view illustrating the lift and carry transfer mechanism according to the present invention.

With reference first to FIGS. 1-3, the lift and carry accumulating conveyor 10 according to the present invention is thereshown comprising a frame 12 having a pair of spaced and parallel support rails 14 along the top of the frame 12. A plurality of longitudinally spaced work support members 16 are secured to each rail 14 so that each work support member 16 on one rail is in lateral alignment with a work support member 16 on the opposite rail 14. Each stationary work support member has an upwardly facing channel 18 which is adapted to receive and hold one end of a workpiece 20 so that the workpiece 20 is supported transversely across the rails 14 by the work support members 16.

The support rails 14 with their work support members 16 define a conveyor track 22 along which the workpieces generally are transported. Moreover, each aligned pair of work support members 16 defines a work station 24 along the conveyor track 22 and the work stations 24 are equidistantly spaced from each other by a predetermined interval. As will become hereinafter apparent, means are provided for incrementally carrying each workpiece 20 from one work station 24 and to the next forward work station 24.

Still referring to FIGS. 1-3, the means for incrementally lifting and carrying the workpieces 20 from one work station and to the next forward work station along the conveyor track 22 is thereshown and comprises a main carriage assembly 26 and an actuating carriage assembly 28. The actuating carriage assembly 28 is longitudinally slidably mounted to the frame 12 by rollers 29 while the main carriage assembly 26 in turn is longitudinally slidably mounted to the actuating carriage assembly 28 by rollers 30. Reciprocating means 31 (illustrated only diagrammatically) longitudinally reciprocally drives the main carriage assembly 26 between forward and a retracted position with respect to the frame 12. Similarly, a second reciprocating means 32 reciprocally longitudinally drives the actuating carriage assembly 28 between a forward or actuating position and a retracted or nonactuating position with respect to the main carriage assembly 26. The reciprocating means 32 can comprise, for example, a hydraulic piston 32A and cylinder 32B arrangement operatively disposed between the carriage assembly 26 and 28, as shown diagrammatically in FIG. 3, and, likewise, the reciprocating means 31 can comprise a hydraulic piston and cylinder arrangement operatively disposed between the frame 12 and the main carriage assembly 26.

With reference now particularly to FIGS. 1 and 3, a plurality of lift and carry members 36 are provided for lifting and carrying the workpieces from one work station and to the next forward station. The lifting members 36 are arranged in laterally aligned pairs and each lifting member 36 includes an upwardly facing channel 40 similar in construction to the rail work support channels 18. Each laterally aligned pair of lifting members 36 are secured together by a plate 38 to form a lifting assembly 39 and the lifting assembly 39 is pivotally secured to the main carriage assembly 26 by pivot arms 35 and pivot pins 42 at predetermined intervals along the main carriage assembly 26 corresponding to the interval between adjacent work stations 24. In addition, each lifting assembly 39 includes a cam surface 44 (FIGS. 4 and 5) formed along the lower surface of the plate 38 which tapers downwardly in a direction away from the pivot pins 42.

As best shown in the lower portion of FIG. 5, each pair of lift and carry members 36 is individually and independently movable between an upper workpiece engaging position illustrated at 52 and a lower workpiece clearing position illustrated at 54. When the lifting members 36 are in their upper position 52, thus engage a workpiece 20 at its associated work station 24 and lift it off from the stationary rail supports 16. Conversely, when the lifting members 36 are in their lower position 54, the lifting members 36 will not engage, but rather will clear the workpieces 20 at their work station 24 despite longitudinal reciprocation of the main carriage assembly 26.

With reference now to FIGS. 1, 3, 4 and 5, an actuating member 100 is thereshown for selectively moving the lifting members 36 between work engaging position 52 and work clearing position 54. The actuating member 100 further comprises a shaft 102 which extends transversely across and is rotatably mounted to the actuating carriage 28. An outwardly extending arm 104 is secured at one end to the shaft 102 and, at its other end, has a roller 106 rotatably mounted to it. The roller 106 moreover, registers with the lower cam surface 44 on the plate 38. In addition, a short bar 108 is secured to one end of the shaft 102 outside of the actuating carriage assembly 28 for a reason to be subsequently described.

Figure 4:
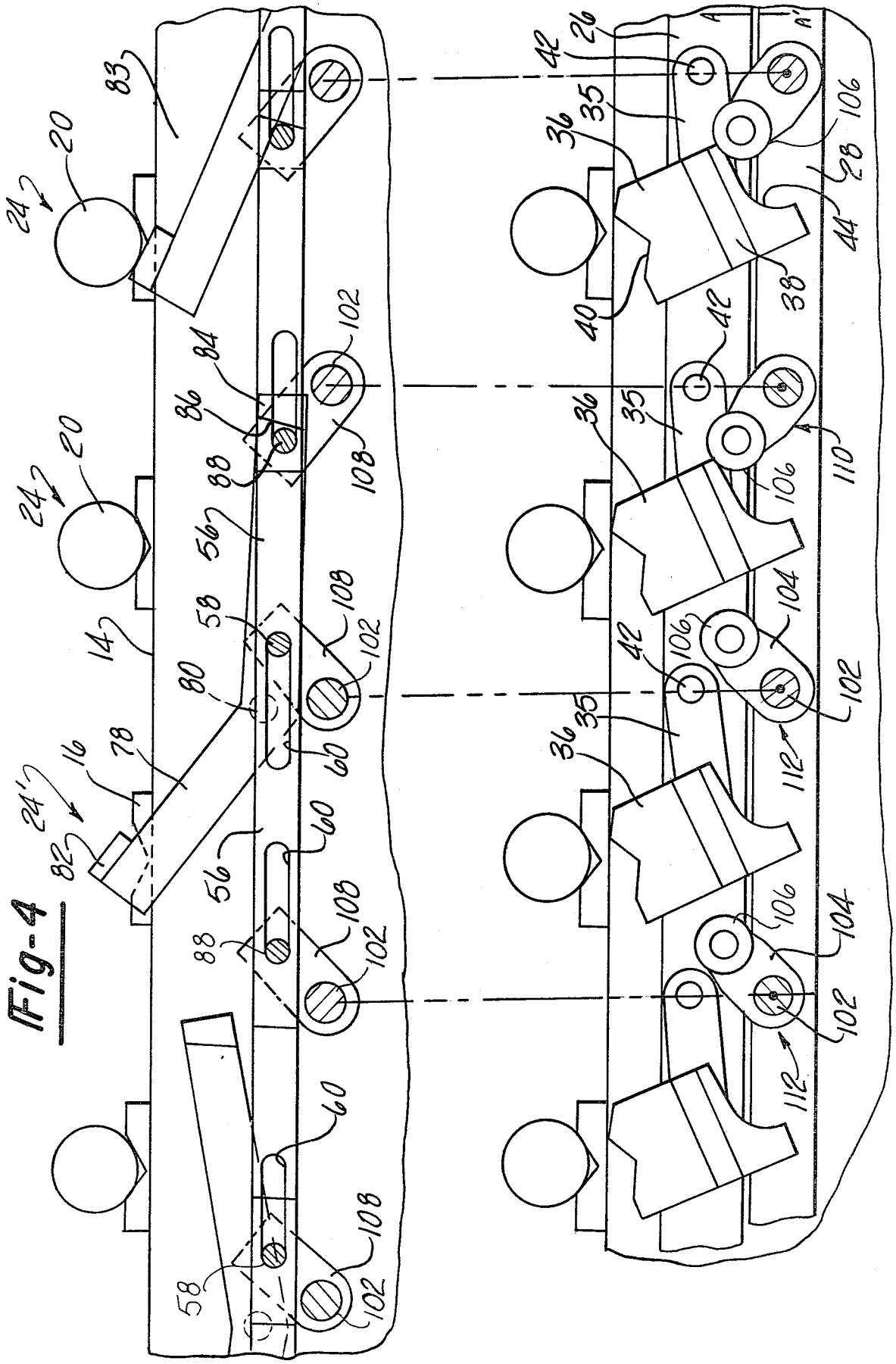

With reference now to FIGS. 4 and 5, the arms 104 are pivotal with respect to the actuating carriage assembly between a first position illustrated at 110 and a second position illustrated at 112. Any conventional stop means (not shown) can be used to limit the pivotal movement of the arms 104 between their first and second positions.

As is best shown in FIG. 5, with the arms 104 in their second position 112, upon extension of the actuating carriage 28 to its forward or actuating position, the rollers 106 do not engage the lifting member cam surface 44 so that the lifting members 36 remain in their lower workpiece clearing position 54. Conversely, with the arms 104 in their first position 110, upon the forward extension of the actuating carriage 28 the roller 106 engages the cam surface 44 and elevates the lifting members 36 upwardly to their workpiece engaging position 52 as shown in the lower right hand portion of FIG. 5. Simultaneously, due to the contour of the cam surface 44 the arm 104 pivots to a generally vertical position as shown at 116.

With reference now to FIGS. 3 and 4, an elongated link bar 56 is connected by a link bar pivot pin 58 to each short bar 108 along one lateral side of the conveyor track 22. Each link bar 56 extends forwardly from its short bar 108 and is connected to the next forward link bar pivot pin 58 by means of a longitudinally elongated slot 60 formed through the link bar 56. The slot is longitudinally dimensioned so that the actuating member 100 can pivot from its second position 112 to its first position 110 while the next forward actuating member will remain in its second position. When this occurs, the pivot pin 58 for the next forward or unactuated lifting member shifts from the front of the slot 60 and to the rear of the slot 60.

The movement of the actuating member 100 from its second and to its first position, however, shifts link bars 56 extending rearwardly of it forwardly by an amount substantially equal to the length of the slot 60 and, in doing so, moves all of the actuating members 100 to their first position. In addition, suitable means 66 (FIG. 3) are operatively associated with the link bars 56 for longitudinally shifting the link bars 56 and returning all of the actuating members 100 to their second position. When this occurs, each of the link bar pivot pins 58 will be positioned along the front end of the slot 60 of its rearwardly extending link bar 56.

As will be shortly described in greater detail, the lift and carry conveyor system 10 according to the present invention is an accumulating system in which the lifting members 36 are selectively actuated from their lower workpiece clearing position and their upper workpiece engaging position only when one or more of the work stations 24 is vacant. When this occurs, the lifting member 36 at the forwardmost vacant work station and all of the lifting members rearwardly of it are actuated to their upper workpiece engaging position. Conversely, all of the lifting members forwardly of the forwardmost vacant work station 24 remain in their lower workpiece clearing position.

The means for selectively actuating the lifting members 36 in the above described fashion is best shown in FIGS. 1, 3 and 4 and comprises a detector arm 78 pivotally mounted by a pin 80 to the frame 12 for each work station 24. Each detector arm is pivotal between an upper position and a lower position and each arm is connected to the frame so that by gravity the detector arm 78 is urged toward its upper position in which a portion 82 (FIG. 4) of the detector arm 78 extends upwardly from and above the stationary work support 16 secured to the rails 14. Conversely, in its lower position, as will occur when a workpiece is positioned at the work station 24, the weight of the workpiece 20 pivots the detector arm 78 in a counterclockwise direction (as viewed in FIG. 4) to the position shown at 83.

A cam 84 having a cam surface 86 is secured to the end of the detector arm 78 opposite from the portion 82 so that the cam surface 86 slopes upwardly and away from the direction of its pivot pin 80. The cam surface 86 cooperates with a cam pin 88 which is connected to and extends laterally outwardly from the upper end of the short bars 108. When the detector arm is in its lower position, the detector arm cam surface 86 is pivoted upwardly and away from the cam pin 88 so that the cam surface 86 does not engage the cam pin 88. Conversely, with the detector arm 78 in its upper position, the cam surface 86 is pivoted downwardly due to the weight of the detector arm 78 so that the cam surface 86 engages the cam pin 88 during retraction of the main carriage assembly 26 and just prior to the rearwardmost longitudinal position of the main carriage assembly 26. Upon engagement of the cam surface 86 with the cam pin 88, the continued retraction of the main carriage assembly 26 pivots the short bar 108, and thus the entire actuating member 100, from its second position 112 and to its first position 110 (FIG. 4).

The pivoting of the actuating member 100 by its associated detector arm 78 from its second position 112 and to its first position 110 simultaneously longitudinally shifts the rearwardly extending link bar 56 associated with the pivoted actuating member 100 forwardly and thus also pivots the next rearward actuating member 100 from its second into its first position. The pivoting of the next rearward actuating member 100 likewise longitudinally shifts its rearwardly extending link bar 56 forwardly thus moving the next rearward actuating member 100 to its first position and so on throughout the conveyor system 10. In this fashion, all actuating members 100 at and rearwardly of the forwardmost pivoted actuating member 100 are likewise moved or pivoted from their second position 112 and to their first position 110.

Each detector arm 78 extends from one work station 24 at which the portion 82 senses the absence of a workpiece and to the next rearward work station 24 at which the cam surface 86 pivots the actuating member 100. Thus, to prevent interference between adjacent detector arms 78, the detector arms are alternatively disposed on opposite lateral sides of the conveyor track 22 as is best shown in FIG. 3. A short bar 108 is also connected to both axial ends of every other shaft 102 to cooperate with every other detector arm 78.

The operation of the conveyor system 10 according to the present invention will now be described with particular reference to FIGS. 4–6. The reciprocal drive means 31 for the main carriage 26 reciprocally and continuously drives the main carriage assembly 26 along with the actuating carriage assembly 28 between a forward and retracted position. The distance between the forward and retracted position of the main carriage assembly 26 is equal to the distance between adjacent work stations 24.

The secondary carriage assembly 28 moves along with the main carriage assembly 26 while the second reciprocal drive means 32 longitudinally displaces the secondary carriage 28 between a forward or actuating position and a retracted or non-actuating position with respect to the main carriage assembly 26. The longitudinal stroke of the secondary carriage assembly 28 is shorter than the stroke for the main carriage assembly 26 and the reciprocal drive means 32 for the secondary carriage assembly is synchronized with the reciprocal drive means 31 for the main carriage assembly in the following fashion.

With the main carriage assembly 26 in a retracted position and prior to its forward extension, the secondary carriage assembly 28 is moved from its retracted nonactuating position into its forward actuating position with respect to the main carriage assembly 26. Thereafter, the main carriage assembly 26 is moved from its retracted into its forward position while the secondary carriage assembly 28 is maintained in its forward position.

With both the main carriage assembly 26 and the secondary carriage assembly 28 in the forwardmost position, the secondary carriage assembly 28 is moved to its retracted nonactuating position with respect to the main carriage assembly 26. Thereafter, the main carriage assembly 26 is moved by the reciprocal drive means 31 from its forward and to its retracted position while the secondary carriage assembly 28 is maintained in its retracted position. This cycle is then continuously repeated. It should also be remembered that all of the actuating members 100 are moved to the second pivotal position at the forwardmost extension of the main and secondary carriage assemblies 26 and 28.

Assuming now that one workpiece 20 is positioned in each and every work station 24 along the conveyor track 22, all of the actuating members 100 will be moved to their second position 112 (FIG. 4) during the first reciprocation of the carriage assemblies 26 and 28. Moreover, since the workpiece 20 is positioned at each work station 24, the weight of the workpieces 20 will move the detector arm 78 to their lower position in which the cam surface 86 is positioned above the cam pins 84 on the short bars 108. Thus, when the secondary carriage assembly 28 is moved from its retracted and to its forward position when the main carriage assembly 26 is in its retracted position, the rollers 106 on the actuating members 100 will not engage the actuating member cam surface 44 but rather will move to the position shown at the lower left portion of FIG. 5. Consequently, all of the lifting members 36 will remain in their lower workpiece clearing position 54 and thus will not engage the workpieces 20 upon the subsequent forward extension of the main carriage assembly 26.

With reference now to FIG. 4, assuming one work station 24' along the conveyor track 22 is vacant, the detector arm 78 associated with the vacant work station 24 moves in a clockwise direction to its upper position in which the detector arm portion 82 is positioned above the stationary work support 16. Simultaneously, the cam surface 86 on the other end of the detector arm 78 is positioned in registration with the cam pin 88 on the short bar 108 of the next rearwardly actuating member 100. Thus, as the main carriage assembly 26 is moved to its retracted position and with the actuating carriage assembly 28 also in its retracted position as shown in FIG. 4, the cam surface 86 on the detector arm 78 engages the cam pin 88 and pivots the short bar 108 with its attached actuating member 100 to its first position as shown at 110.

As has been previously described, the pivoting of the actuating member 100 to its first position in turn pivots all actuating members 100 rearwardly of it to their first positions via the link bars 56. All actuating members 100 forwardly of the most forward vacant work station, however, remain in their second position 112 due to the elongated slot 60 connecting the link bar 56 with its next forward short bar 108. Thus, as is shown in FIG. 4, the link bar pivot pin 58 for the short bar 108 immediately forward of the pivoted short bar 108 is positioned at the rear end of the slot 60 while the pivot pins of the short bars 108 forwardly of it are positioned at the forward end of the slot 60.

With reference now to FIG. 5, as the actuating carriage assembly 28 moves to its forward actuating position, the actuating member 100 at the work station 24 rearwardly of the vacant work station 24' engages the lifting member cam surface 44 and moves the lifting member 36 to its upper workpiece engaging position 52 thus lifting the workpiece 20 up from its stationary rail supports 16. The actuating members 100 at the vacant work station 24 and those forwardly of it, however, are in their second or nonengaging position 112 so that the lifting members 36 remain in their lower workpiece clearing position 54.

With reference now to FIG. 6, the main carriage assembly is moved to its forward position along with the actuating carriage assembly 28 in its forward position. Consequently, all of the lifting members 36 in their upper workpiece engaging position 52 lift and carry the workpieces 20 at their respective work stations 24 to the next forward work station 24. As shown in FIG. 6, with both carriage assemblies 26 and 28 in their forward position, the actuating carriage assembly 28 is then moved to its retracted position thus lowering all of the lifting members 36 to their lower workpiece clearing position. Moreover, as is shown in FIG. 6, prior to the retraction of the main carriage assembly 26, the actuating members 100 are moved to their second position 112 by the means 66 (FIG. 3). The main carriage assembly 26 is then moved to its retracted position and the above described cycle is repeated.

From the foregoing it can be seen that the lift and carry accumulating conveyor system according to the present invention provides a simple and yet highly effective lift and carry conveyor mechanism. Moreover, the conveyor system 10 of the present invention is highly advantageous in that only longitudinal displacement of the actuating carriage assembly 28 is required in order to lift the workpieces 20 up from their stationary work supports 16 thus eliminating the previously required lifting means for vertically displacing the entire carriage assembly.

Having described our invention, however, many modifications thereto will become apparent to those skilled in the art to which it pertains without deviation from the spirit of the invention as defined by the scope of the appended claims.

We claim:

1. A mechanical automatic accumulating transfer mechanism comprising:
    an elongated frame, said frame comprising a plurality of work support members secured to and spaced longitudinally along said frame and on each lateral side thereof, said support members on opposite lateral sides of the frame being in alignment with each other and forming a work station along the frame adapted to receive and support a workpiece;
    a main carriage assembly and means for longitudinally slidably mounting said main carriage assembly to said frame between a forward and a retracted position;
    means for longitudinally reciprocally moving said main carriage assembly between said forward and said retracted position;
    a plurality of lifting members pivotally secured to said main carriage assembly at longitudinally spaced intervals therealong so that at least one lifting member is associated with each work station, said lifting members being pivotal between an upper position and a lower position wherein in said upper position said lifting members engage and elevate a workpiece at their associated work station up from the work support members at said work station and wherein in said lower position said lifting members are positioned below a workpiece supported by the work support members at said work station;
    means for moving said lifting members between their upper and lower position when said main carriage assembly is in its forward or retracted position, and wherein said means for moving said lifting members between said upper and said lower position comprises:
    an actuating carriage assembly and means for longitudinally slidably mounting said actuating carriage assembly to said main carriage assembly so that said actuating carriage assembly is movable between an actuating position and a nonactuating position with respect to said main carriage assembly;
    means for longitudinally moving said actuating carriage assembly to its actuating position when said main carriage assembly is in its retracted position and for moving said actuating carriage assembly to its nonactuating position when said main carriage assembly is in its forward position;
    means secured to said actuating carriage assembly for pivoting said lifting members to their upper position as said actuating carriage assembly is longitudinally moved to its actuating position and for releasing said lifting members to their lower position when said actuating carriage assembly is longitudinally moved to its nonactuating position; and
    wherein as said lifting members pivot from said lower position to said upper position, said workpiece is engaged and lifted exclusively by the pivoting of said lifting members.

2. The invention as defined in claim 1 wherein said means for moving said actuating carriage assembly further comprises a piston and cylinder arrangement wherein the piston is operatively connected to one carriage assembly while the cylinder is operatively connected to the other carriage assembly.

3. The invention as defined in claim 1 wherein said means for pivoting said lifting members further comprises:
    a plurality of actuating members pivotally secured to said actuating carriage assembly at longitudinally spaced intervals therealong so that at least one actuating member is associated with each lifting member, each actuating member being movable between a first position and a second position wherein said actuating member engages and pivots its associated lifting member to its upper position as said actuating carriage assembly is moved to its actuating position only when said actuating member is in its first position;
    means for detecting the absence of a workpiece at a work station;
    means responsive to said detecting means for moving said actuating member to its first position prior to the movement of said actuating carriage assembly to its actuating position; and
    means for moving all actuating members rearwardly of said actuating member moved to its first position to their respective first positions.

4. The invention as defined in claim 3 and further comprising reset means for moving all of said actuating members to their second position when said main carriage assembly is in its forward position.

5. The invention as defined in claim 3 wherein said detector means further comprises a detector arm pivotally connected at a point forward of its balance point to the frame at each work station, each detector arm being pivotal between an upper position in which a portion at one end of the detector arm extends above the work support members at its associated work station and a lower position in which said detector arm portion is positioned below the work support members at its associated work station, and cam means connected to the other end of the detector arm which engage a cooperating cam follower means on a short bar connected with the actuating member associated with the work station, said detector arm cam means being operable to pivot said last mentioned short bar and its associated actuating member to its first position when said detector arm is in its upper position.

6. The invention as defined in claim 3 wherein said means for moving said actuating members rearwardly of the pivoted actuating member further comprises an elongated link bar extending longitudinally between each short bar and the next rearward short bar, each link bar having a longitudinally elongated slot at its forward end, said link bar being pivotally connected to the short bar at its rear end and means for connecting the link bar to the next forward short bar comprising a pin secured to the last mentioned short bar, said pin being longitudinally slidably positioned in the link bar slot.

7. The invention as defined in claim 5 wherein said cam follower means comprises a pin extending laterally outwardly from said short bar and wherein said detector arm cam means comprises a cam surface formed on the other end of said detector arm.

8. The invention as defined in claim 6 wherein for each work station the short bar and actuating member are both secured to a shaft transversely rotatably secured to the actuating carriage assembly and wherein the link bar pin is radially spaced from the axis of the shaft so that pivoting of at least one short bar to its first position longitudinally forwardly shifts the link bar extending rearwardly from that short bar a predetermined distance to thereby pivot the next rearward short bar to its first position.

9. The invention as defined in claim 8 wherein said predetermined distance is substantially equal to the length of the link bar slot.

10. The invention as defined in claim 3 wherein longitudinally adjacent detector arms are disposed on opposite lateral sides of the frame.

11. A mechanical automatic accumulating transfer mechanism comprising:
an elongated frame, said frame comprising a plurality of work support members secured to and spaced longitudinally along said frame and on each lateral side thereof, said support members on opposite lateral sides of the frame being in alignment with each other and forming a work station along the frame adapted to receive and support a workpiece;
a main carriage assembly and means for longitudinally slidably mounting said main carriage assembly to said frame between a forward and a retracted position;
means for longitudinally reciprocally moving said main carriage assembly between said forward and said retracted position;
a plurality of lifting members pivotally secured to said main carriage assembly at longitudinally spaced intervals therealong so that at least one lifting member is associated with each work station, said lifting members being pivotal between an upper position and a lower position wherein in said upper position said lifting members engage and elevate a workpiece at their associated work station up from the work support members at said work station and wherein in said lower position said lifting members are positioned below a workpiece supported by the work support members at said work station;
means for moving said lifting members between their upper and lower position when said main carriage assembly is in its forward or retracted position;
wherein said means for moving said lifting members between said upper and said lower position comprises:
an actuating carriage assembly and means for longitudinally slidably mounting said actuating carriage assembly to said main carriage assembly so that said actuating carriage assembly is movable between an actuating position and a nonactuating position with respect to said main carriage assembly;
means for longitudinally moving said actuating carriage assembly to its actuating position when said main carriage assembly is in its retracted position and for moving said actuating carriage assembly to its nonactuating position when said main carriage assembly is in its forward position;
means secured to said actuating carriage assembly for pivoting said lifting members to their upper position as said actuating carriage assembly is longitudinally moved to its actuating position and for releasing said lifting members to their lower position when said actuating carriage assembly is longitudinally moved to its nonactuating position; and
wherein said means for slidably mounting said main carriage assembly to said frame further comprises a plurality of first rollers rotatably mounted to the frame and upon which said actuating carriage assembly is longitudinally slidably supported, and a plurality of second rollers rotatably secured to the actuating carriage assembly and upon which the main carriage assembly is longitudinally slidably supported.

* * * * *